O. L. BARNEBEY.
PROCESS OF MAKING CYANIDS.
APPLICATION FILED MAR. 19, 1919.

1,397,613.

Patented Nov. 22, 1921.
3 SHEETS—SHEET 1.

INVENTOR:
O. L. Barnebey

O. L. BARNEBEY.
PROCESS OF MAKING CYANIDS.
APPLICATION FILED MAR. 19, 1919.

1,397,613.

Patented Nov. 22, 1921.
3 SHEETS—SHEET 2.

INVENTOR:
O. L. Barnebey

O. L. BARNEBEY.
PROCESS OF MAKING CYANIDS.
APPLICATION FILED MAR. 19, 1919.

1,397,613.

Patented Nov. 22, 1921.
3 SHEETS—SHEET 3.

INVENTOR:
O. L. Barnebey

UNITED STATES PATENT OFFICE.

OSCAR L. BARNEBEY, OF CLEVELAND, OHIO.

PROCESS OF MAKING CYANIDS.

1,397,613. Specification of Letters Patent. Patented Nov. 22, 1921.

Application filed March 19, 1919. Serial No. 283,638.

*To all whom it may concern:*

Be it known that I, OSCAR L. BARNEBEY, a citizen of the United States, and residing at Cleveland, Ohio, have invented certain new and useful Improvements in Processes of Making Cyanids, of which the following is a specification.

The present invention relates to processes and apparatus for producing cyanids, cyanamids, etc. More specifically it relates to such production wherein certain materials are heated in a suitable atmosphere with proper and substantially exact control of the conditions, such as time, temperature, pressure, etc.

The fundamental bases of the present invention are two in number, first, that cyanids can be economically produced by heating relatively thin layers of mixtures of base, carbon and catalyzer, if any of the last named be required, in an atmosphere of nitrogen for extended periods of time and, second, that this heat treatment can be best accomplished in a three chamber kiln furnace of special construction to give the atmosphere control, temperature regulation and sufficient time for efficient reaction.

Production of cyanids on a small laboratory scale by heating a base such as sodium carbonate with carbon and catalyzer in the presence of nitrogen has been known for a long time. Large scale production applications have thus far not been realized. The reasons for this are as follows:—No furnace heretofore has been invented to give a sufficiently long time treatment necessary for this reaction and at the same time give an economic production of cyanids. Also the elevated temperatures required for reaction rapidly deteriorated the material composing the essential furnace construction. Added to this, previous furnaces have made difficult the movement of charges through such furnaces and the later handling of materials.

In this invention the heating time may be greatly extended over any previous process, in fact, the time element can be extended to any desirable length and the furnace construction is such as to give long life to the installation. In this invention the movements of material and gases are easily regulated and controlled according to predetermined schedule and the materials are charged and discharged in a cooled condition, thus simplifying the mechanical handling of such materials. In the present process, an intimate mixture of a base, such as sodium carbonate, carbon and a catalyzer, such as metallic iron, are used as starting materials. The ingredients are finely ground and thoroughly mixed in the proper proportions and then mixed with an excess of coarse carbon to give porosity to the charge. The mix is then loaded into ceramic or metal pans or trays in layers of uniform thickness, the thickness depending upon the mesh and proportions of materials making up the charge. Layers of one half to three-fourths of an inch and even thicker can be used.

These layers of material are then heated to approximately 900° C. and subjected to reaction with nitrogen likewise heated to this temperature. The uniform layers make possible uniform treatment. These uniform layers expose an enormous surface to contact with the nitrogen. Inasmuch as relatively thin layers are used in this invention there is very little weight to be supported by the material itself and hence there is very little tendency for the charged material to become compressed and a light porous easily penetrable reaction medium is continuously maintained. This easily penetrated mass allows the nitrogen to diffuse into and gaseous products to pass out of the layers of material. The transfer of heat and diffusion of nitrogen into the interior of the thin layers of material is very rapid and constitutes a fundamental feature of this invention. The nitrogen is heated to reaction temperature and is the essential medium for carrying the heat to the material charged into the furnace. It accomplishes this by moving slowly through the reaction zone of the furnace. This slow movement of the gas also allows maximum utilization of the nitrogen supplied for reaction. The nitrogen atmosphere completely fills the entire space of the reaction chamber not occupied by solid matter and circulates between the trays of material. The movement of the nitrogen is in the opposite direction to the movement of the charge, hence the material near the exit end of the furnace serves to heat the nitrogen and the exit gases heat up the entering material. Another advantage gained is that the charge is always finished in an atmosphere high in nitrogen content.

Nitrogen can be produced by any of the usual methods for manufacturing the same, such as fractionation of liquid air or burning oxygen from the air. One adaptation of this invention is to carefully regulate the combustion of liquid, gaseous or solid fuel in such a manner as to give substantially complete combustion, yielding essentially carbon dioxid and nitrogen as the gaseous reaction products. This combustion gas is withdrawn or forced from the combustion chamber and passed into the reaction chamber of the furnace. In such a case, the nitrogen of the combustion gas becomes the reactive gas and unites with the base and carbon to form the cyanid of the base used.

The carbon monoxid formed in reaction can be transferred to the burner system or burned in separate burners supplied for the purpose and used for heating the furnace. When the combustion gases are used as source for nitrogen the carbon dioxid in the gas mixture reacts with the carbon charged into the reaction zone thus greatly increasing the amount of carbon monoxid formed and hence giving greater fuel value to the exit gases from the reaction zone of the furnace.

The apparatus used in carrying out of the present process is shown more or less diagrammatically in the accompanying drawings in which—

The apparatus used in this invention is a triple zone kiln furnace. The furnace is so constructed as to make possible a very accurate control of temperature and gaseous atmosphere within each zone. The outer zone is the combustion zone. This zone is of special construction to give a gas tight zone or chamber of such character as to prevent the products of combustion from entering the central reaction zone. The upper inner zone is a gas tight reaction zone or chamber. Into this zone is introduced the reactive gas nitrogen. Into the lower inner zone cooled combustion gases are passed. These later gases are circulated beneath the reaction zone and remove all chance of air coming into the reaction zone above by leakage through this zone. Each zone is constructed so that it has its own separate control and hence can be regulated in a predetermined manner by the operator.

Figure 1:
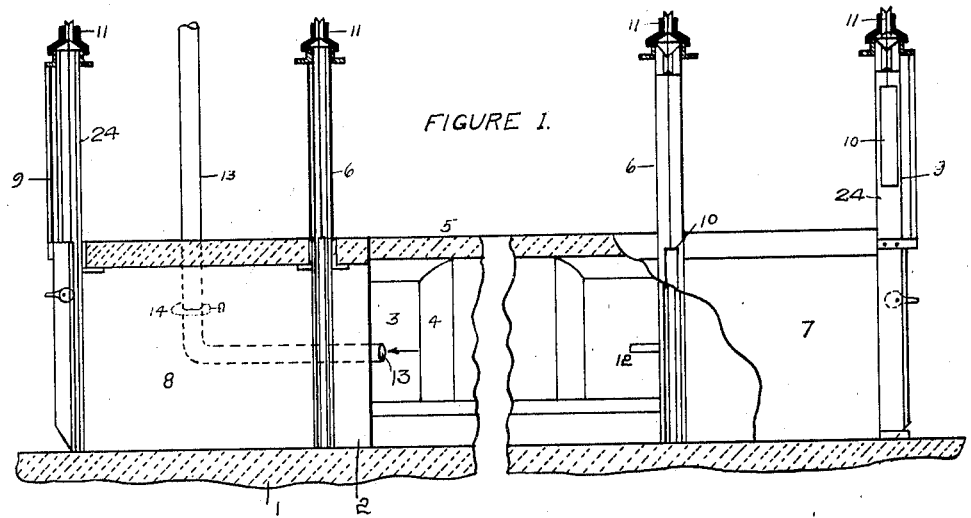
Figure 1 represents a side elevation in longitudinal section of the intake and exit ends of one form of kiln.

Heretofore furnaces of the kiln type have been designed for such purposes as heating brick, ceramic ware, annealing metals, etc. In these furnaces air is allowed and in some cases forced to circulate through the ware. For the manufacture of cyanids air must be rigidly and completely eliminated. In this invention air is not only prevented from entering but the gas condition most desirable is regulated by special features of furnace construction. In the reactive zone the gas nitrogen is introduced in a regulated and controlled manner. The invention is further illustrated by the following description of the apparatus:

In Fig. 1, 1 is the base of the kiln and is constructed of concrete. 2 is the exterior wall of the furnace and is of ordinary brick construction. 3 is a ceramic wall which separates the combustion zone from the reactive zone of the furnace. 4 is the combustion chamber. 5 is the silocel cover top which covers the entire top of the furnace and serves for insulation. Silocel is a mineral substance having the following composition:

| | |
|---|---|
| $SiO_2$ | 89.17% |
| $Al_2O_3$ | 1.65 |
| $FeO$ | 0.64 |
| $TiO_2$ | 0.03 |
| $CaO$ | 0.54 |
| $MgO$ | 0.52 |
| Loss on ignition (mostly combined moisture) | 6.64 |

A layer of this same insulating material separates the outer fire brick wall of the combustion zone from the common brick exterior of the furnace. 6 are the gas tight doors which completely close off the intake and exit vestibules 7 and 8. 9 are intake and exit doors to and from the furnace. These doors are constructed of asbestos and are lifted by the outer poised weights 10 attached to the pulleys 11. The wires operate through stuffing boxes thus maintaining gas tight connections. Nitrogen or combustion gases enter through 12 and the excess of these gases combined with gases produced by reaction escape through the exit 13. The gases introduced into the kiln are regulated in the required manner and the pressure within the reactive zone maintained by the control dampers or valves 14 in pipes 13.

Figure 2:
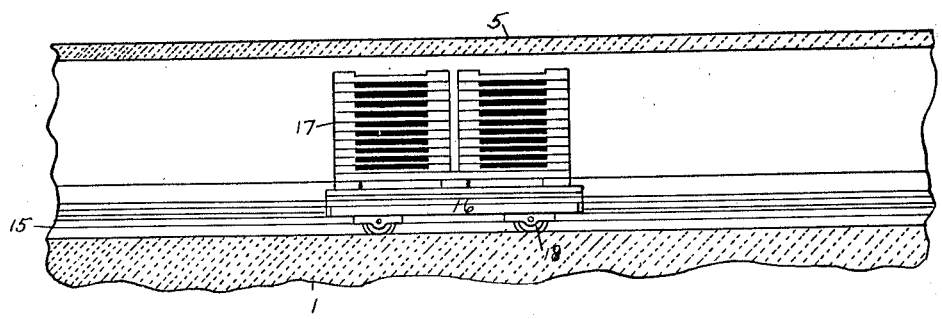
Fig. 2 is a side elevation in longitudinal section of a portion of the kiln with a car of material therein.

In Fig. 2 the rails 15 guide and support the car in its travel through the kiln. The trays 17 are shown in vertical stacks on the car. The wheels 18 make easy the movement of the car.

Figure 3:
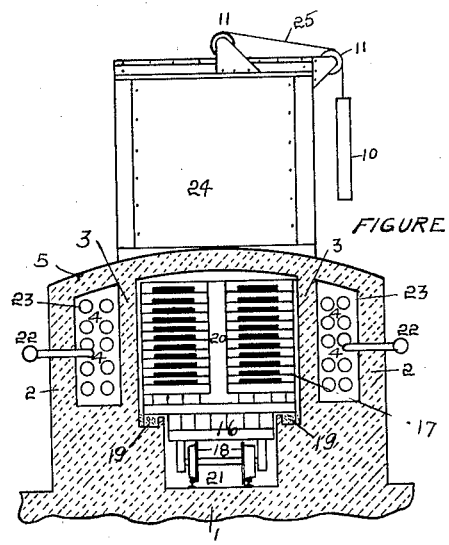
Fig. 3 is a vertical cross section of the kiln in the region of the burners along the line A—A of Fig. 8.

In Fig. 3 is shown the relation of the foundation 1, the outer wall 2, the wall 3, the combustion chambers 4 and the crown 5. 5 consists of a fire brick arched crown covered with silocel or similar insulation material. The car 16 is shown in the center of the kiln. The distance between the wall 3 as well as the crown 5 and the stacks of trays 17 is relatively small, which condition forces a better circulation of the reactive gas, nitrogen, through the open spaces between the trays of charged material. The sand seals 19 prevent the interchange of gases from the hot reaction chamber 20 and the chamber 21 which is maintained under a regulated cooling condition to keep the wheels 18 and other metal parts of the car 16 at a relatively low temperature. The burners 22 introduce gas for combustion into the combustion chambers 4, and from these chambers the hot combustion gases pass through the iron pipes 23 which assist in transferring the heat to the reaction chamber 20. From these pipes the combustion gases escape to the flue or are otherwise used as hereinafter described. The doors 9 are incased in the iron riveted frame work 24, the construction of which is made gas-tight and are provided with a stuffing box through which the iron cables 25 move. The pulleys 11 give direction to the cables and the weights 10 act as counter-poises.

Figure 4:
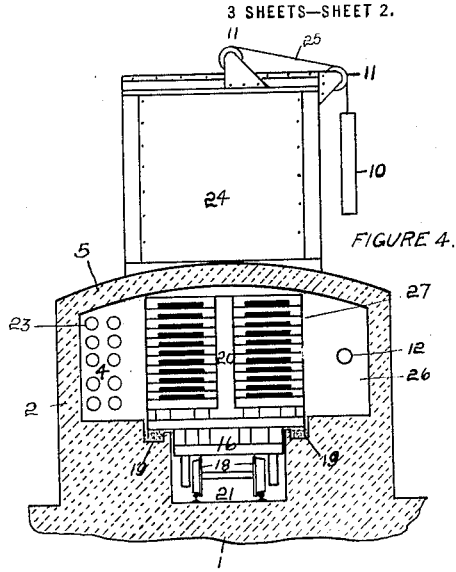
Fig. 4 is a vertical cross section of the kiln near the exit end along line B—B of Fig. 9.
Figure 5:
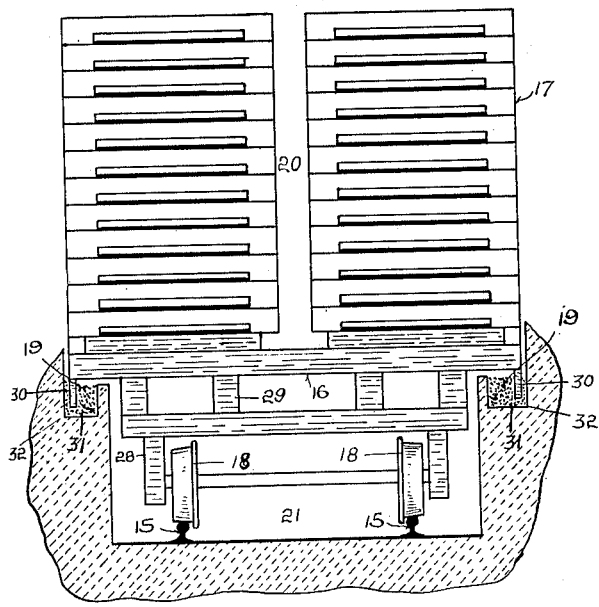
Fig. 5 is an end view of one form of car showing the operation of the sand seals.
Figure 6:
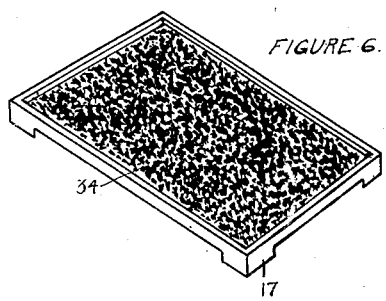
Fig. 6 is an isometric view of a tray filled with material to be treated.
Figure 7:
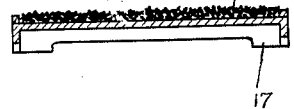
Fig. 7 is a sectional view of such a tray.

Fig. 4 shows the indenture 26, into which the tube 12 admits nitrogen. The indenture 26 connects directly with the reaction chamber 20.

One form of car used in this invention consists of a metal truck 28 with superstructure of ceramic material 29. This superstructure connects with a sand seal indicated as a whole by numeral 19, by means of iron flange 30 extending into the trough 32, the latter being filled with sand 31. This sand seal separates the hot inner reaction chamber 20 and the cooled chamber 21. The trays 17 are stacked on the cars 16 in such a manner as to fill the reaction zone of the furnace as completely as possible, thus producing a good circulation between them and over the layers of charged material contained within the trays.

The tray 17 is filled with material 34 to be treated with nitrogen. This tray is designed to allow convenient filling which is accomplished by adding loosely more material than the tray will conveniently hold then removing the excess by means of a straight edge.

Figure 8:
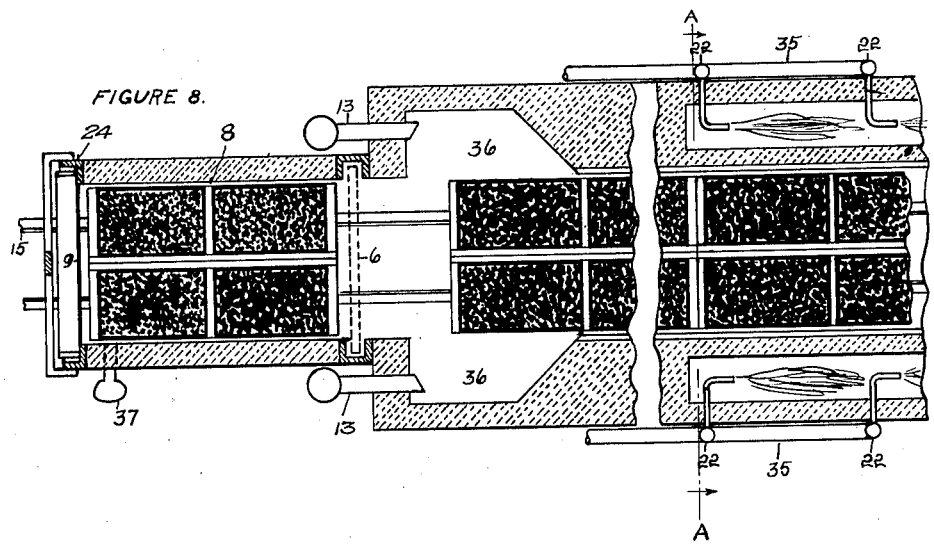
Fig. 8 is a plan view partly in section of the intake end of the kiln and a portion of the central part of the kiln, showing cars of material in place.

In Fig. 8, there is shown the charged material in trays as it appears loaded on cars in movement through the kiln. The burners (22) are shown connected with manifolds (35), which arrangement allows any multiple of burners required to give the horizontal temperature gradient desired. A chamber (36) is built into the wall structure of the furnace to give a large space into which the reaction gases may expand previous to entrance into the exit stacks (13). The stack (37) provides for the exit of the cooling gases which move in the lower zone.

Figure 9:
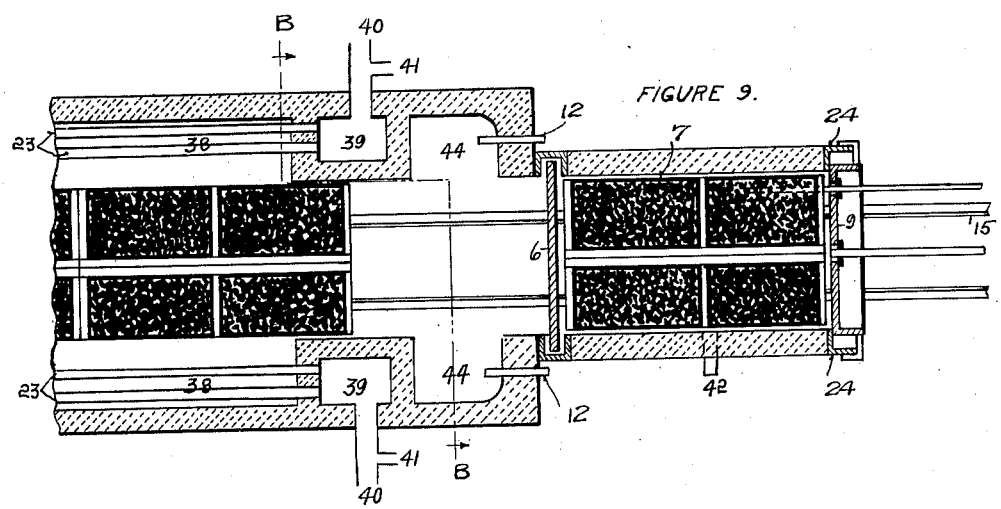
Fig. 9 is a similar view of the exit end of the kiln.
Figure 10:
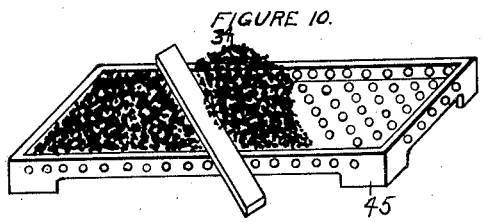
Fig. 10 is an isometric view of a tray illustrating the method of filling.

Fig. 9 shows the trays loaded with material containing cyanid along with the excess of materials of the original charge. The space 38 contains the iron pipes 23 conducting the combustion gases into the expansion chamber 39, from which they are removed through flue stack 40 or through 41 thence to 42 to be introduced into the inner lower cooler chamber. Nitrogen is conducted into the distributing chamber 44 and thence this gas passes into the reaction chamber of the furnace.

The usual pyrometer equipment of observation tubes, connections for sampling gases, etc., accompanies the furnace, such being standard for any furnace operation. Likewise standard control valves, blast gates, piping, fans for handling gases, etc., are installed in the necessary places for their appropriate functions, such being necessary in the operation of this apparatus but not developed or designed as component parts of this invention.

An example of the operation of the process and apparatus as conducted is as follows: Equal parts of sodium carbonate and carbon are finely ground and while being thoroughly mixed ten per cent. of the mixture by weight of iron oxid is added. Mixing is continued until the entire mass is homogeneous. The material is then mixed thoroughly with ten per cent. by weight of coarse carbon. This mixture is charged into the trays and loaded upon the cars, in vertical stacks and is then ready for treatment with nitrogen. The furnace is brought slowly up to temperature and the regulated temperature gradient obtained. Nitrogen is swept through the reaction chamber of the furnace under slight positive pressure until the air has been almost, if not entirely, removed. Cars are then pushed into the furnace by means of a mechanical pusher filling the reaction chamber with trays of charged material. By close contact of the cars which fit snugly together end to end, and the sand seal, the lower cool chamber is established. The double door systems at each end of the kiln are operated so as to prevent air from entering the kiln. The reaction chamber is kept continuously under slight positive pressure of nitrogen gas which condition pushes gas outward whenever a door is opened. When the tunnel is full of cars, cooled combustion gases are admitted at the exit end of the kiln and these gases caused to circulate through the lower chamber keeping the moving parts of the cars cool. At regular intervals the mechanical pusher is stopped, the inner door at the exit end closed, the outer door is then opened and a car withdrawn after which the outer door is closed and inner door at the exit again opened. The inner door at the intake end is closed. Another car loaded with charged material is then pushed into the intake vestibule after which the outer intake door is closed and the inner door opened, the pusher then operating through a stuffing box through the outer door then gradually pushes the entire train of cars at a regular predetermined rate forward one car length. This process is repeated continuously. In starting the furnace operation the cars first removed are returned to the kiln again inasmuch as these cars did not receive full time scheduled heat treatment. The length of time for reaction is established by the length of heated reaction chamber and the rate of movement of the cars. In this specific example an eight hour nitrogen treatment is used at a reaction temperature of 980° C.

After the material has been withdrawn from the furnace it is removed from the trays, extracted with water or some other solvent and evaporated thus yielding crystalline sodium cyanid or anhydrous sodium cyanid depending upon the temperature utilized in the evaporation and the length of time the solid is heated after the evaporation of the solvent. This process is best conducted in partial vacuum. The discharged material may be heated in an autoclave in the presence of steam thus yielding ammonia which in turn can be liquefied, made into aqueous ammonia, converted into ammonium sulfate or any other form desired. When ammonia is thus produced the residual material consisting essentially of sodium formate, which on heating forms sodium carbonate again, iron and excess of carbon can be used in making up subsequent material for charging, thus conserving material. On the other hand, the sodium formate may be extracted and used as a source for formates, formic acid, etc., in which case the residual iron and carbon are then worked into subsequent furnace charges.

The example is given as illustrative of the general operation of the process and apparatus. However, the use of process and apparatus is not limited to this specific example. There are many modifications and adaptations of both process and apparatus by means of which not only sodium cyanid but other cyanids can be manufactured. Nitrifying processes other than production of cyanid can be performed in this apparatus. For instance, calcium carbid can be converted to calcium cyanamid by treatment with nitrogen at the appropriate temperature under controlled conditions, made possible in this invention. The apparatus can also be adapted to other fields of manufacture where heating materials in the presence of a particular gas under regulated control is necessary or desirable.

I claim:

1. In a process of making cyanids, effecting an endothermic reaction by heating layers of a base or base yielding compound and carbon in nitrogen.

2. In a process of making cyanids, effecting an endothermic reaction by heating layers of a base or base yielding compound, carbon and a catalyzer in an atmosphere of nitrogen.

3. An endothermic process comprising heating stacks of thin layers of a mixture of a base or base yielding compound, carbon and a catalyzer in an atmosphere of nitrogen and moving said stacks through a reaction zone maintained at high temperature.

4. In a process of producing cyanids, effecting an endothermic reaction by moving a substantially quiescent layer of a mixture containing a base or base yielding compound and carbon through an atmosphere of nitrogen maintained at high temperature.

5. In a process of producing cyanids, effecting an endothermic reaction by moving a substantially quiescent layer of a mixture containing a base or base yielding compound, carbon and catalyzer through an atmosphere of nitrogen maintained at high temperature.

6. In a process of producing cyanids, effecting an endothermic reaction by treating with nitrogen under slight, positive gaseous pressure and at high temperature a mixture of a base or base yielding compound, carbon and a catalyzer.

7. In a continuous endothermic process of nitrifying a charge of a base or base yielding compound, carbon and catalyzer, heating relatively thin layers of said charge with nitrogen and continuously moving said charge through the action zone.

8. In a process of making cyanids, effecting an endothermic reaction by subjecting layers of a charge of a base or base yielding compound and carbon in nitrogen to regulated heating so that a definite high temperature of the charge and nitrogen is maintained throughout the reaction.

9. In a process of making cyanids, effecting an endothermic reaction by subjecting layers of a charge of a base or base yielding compound, carbon and iron in an atmosphere of nitrogen to regulated heating so that a definite high temperature of the charge and nitrogen is maintained throughout the reaction.

10. In a process of producing cyanids, effecting an endothermic reaction by moving a substantially quiescent layer of a charge containing a base or base yielding compound and carbon through an atmosphere of nitrogen and maintaining said charge and nitrogen at a definite high temperature throughout the reaction.

11. In a process of producing cyanids, effecting an endothermic reaction by moving a substantially quiescent layer of a charge containing a base or base yielding compound, carbon and catalyzer through an atmosphere of nitrogen and maintaining said charge and nitrogen at a definite high temperature throughout the reaction.

12. In a continuous endothermic process of nitrifying a charge of a base or base yielding compound, carbon and catalyzer, subjecting relatively thin layers of said charge with nitrogen to regulated heating so that said charge and nitrogen are maintained at a definite high temperature throughout the reaction and continuously moving said charge through the reaction zone.

OSCAR L. BARNEBEY.